United States Patent [19]
Miller

[11] Patent Number: 6,092,867
[45] Date of Patent: Jul. 25, 2000

[54] GAMING CONSOLE

[76] Inventor: Patrick Miller, 3868 Lee Ridge Way, Lilburn, Ga. 30047

[21] Appl. No.: 09/065,288

[22] Filed: Apr. 23, 1998

[51] Int. Cl.$^7$ ..................................................... A47C 7/62
[52] U.S. Cl. .................................. 297/188.14; 297/250.1; 297/162; 297/411.37; 297/217.3
[58] Field of Search ........................... 297/188.14, 188.2, 297/116, 135, 160, 161, 162, 170, 172, 174, 217.1, 217.3, 217.4, 256.16, 232, 411.32, 411.37, 250.1, 411.24, 411.1, 411.4, 233, 239; 345/168

[56] References Cited

U.S. PATENT DOCUMENTS

| | | |
|---|---|---|
| D. 283,092 | 3/1986 | Johnston . |
| D. 377,126 | 1/1997 | Foco et al. . |
| 2,308,315 | 1/1943 | Smith ................................ 297/250.1 X |
| 3,004,794 | 10/1961 | Yerkovich .......................... 297/411.1 X |
| 4,561,619 | 12/1985 | Robillard et al. . |
| 4,781,413 | 11/1988 | Shumack, Jr. .................. 297/188.14 X |
| 4,852,500 | 8/1989 | Ryburg et al. . |
| 4,868,888 | 9/1989 | Dayton .............................. 297/217.4 X |
| 5,022,706 | 6/1991 | Bryan ....................................... 297/162 |
| 5,116,098 | 5/1992 | Wooten . |
| 5,324,036 | 6/1994 | Morrow . |
| 5,332,286 | 7/1994 | Atherton et al. ................ 297/188.14 X |
| 5,419,613 | 5/1995 | Wedeking . |
| 5,568,773 | 10/1996 | Hung . |
| 5,573,320 | 11/1996 | Shearer . |
| 5,612,718 | 3/1997 | Bryan .............................. 297/411.37 X |
| 5,688,024 | 11/1997 | Arizpe-Gilmore .................... 297/217.1 |
| 5,807,177 | 9/1998 | Takemoto et al. ............... 297/217.3 X |

FOREIGN PATENT DOCUMENTS

| | | | |
|---|---|---|---|
| 251643 | 7/1988 | European Pat. Off. ............ | 297/217.3 |

OTHER PUBLICATIONS

*Intensor*: Get Ready to go for a Ride; BSG Laboratories, Inc.; Sales Brochure.
Intensor Web–Site Screen Shots; website located at www.intensor.com.

*Primary Examiner*—Laurie K. Cranmer
*Attorney, Agent, or Firm*—Jones & Askew, LLP

[57] ABSTRACT

A gaming console that retains gaming devices in a cockpit-like arrangement for enhancing the experience of home video game playing. The gaming console includes a seat for the game player and armrests for the game player's arms. Each armrest is equipped with a device retainer that provides a sturdy mount for gaming devices. A game player can place the gaming console in an existing chair, thereby permitting the game player to sit on the seat of the gaming console at an elevation suitable for home video game playing. By grasping the gaming devices mounted on the device retainers, the game player can play the home video game. The armrests are tilted inward, providing the effect of being surrounded by a control panel. The gaming console is modular in that additional components can be added to the gaming console without changing the basic structure of the gaming console. Additional components include a laptop table, a mouse pad, a storage compartment, and a sound system.

28 Claims, 7 Drawing Sheets

GAMING CONSOLE

TECHNICAL FIELD

The present invention relates generally to gaming consoles and more particularly to a gaming console for enhancing the interaction between a game and a game player.

BACKGROUND OF THE INVENTION

Video games are generally available in two varieties: the kind found in an arcade, and the kind found in homes. In recent times, the video games found in arcades have evolved from the stand-up type game console to consoles permitting more game player interaction. The first video arcade games were stand-up units, with input devices that were typically limited to a joystick and/or buttons. The next wave of arcade video games integrated more sophisticated controls, such as gun-type and periscope-type input devices. More recently, arcade video games have integrated electronic and mechanical devices designed to make arcade video games more interactive, thereby enhancing the game player's sensory experience.

Recent modifications aimed at enhancing arcade video games include the use of gaming consoles providing a seat for the game player. Where the "theme" of an arcade video game involves an activity such as flying an airplane or driving a race car, the seated gaming consoles provide a more realistic feel to the game player. Such seated gaming consoles have been further enhanced by adding a pedal accelerator, rather than hand-operated accelerators; adding a roof and walls to surround the game player, thereby simulating the "cockpit" environment of an airplane or race car; and adding a motion source to simulate the movement that might be created by the activity depicted on the video game screen.

Home video games originated as television set-top boxes with controllers (e.g., joysticks, button pads) connected thereto. Game players typically held a controller and sat in front of the television set on which the video game was being displayed. Recent modifications to home video games include the addition of more sophisticated controllers, such as glove-type and touch pad-type input devices. These input devices have enhanced the interactivity of home video games, but have not provided the enhanced sensory experience that is provided by arcade video games. The improvements made to arcade video games have been prohibitively expensive and too space consumptive to achieve widespread acceptance among home video game players.

Accordingly, there is a need to reduce the disparity between the gaming experience available to the arcade game player and that available to the home video game player, by providing an improved gaming console. The improved gaming console should be inexpensive and conveniently sized for home use. The improved gaming console should also be implemented as a modular console that can accommodate a variety of home gaming units. Furthermore, the improved gaming console should be capable of accommodating other activities such as Internet browsing and general computer use.

SUMMARY OF THE INVENTION

The present invention satisfies the above-described needs by providing an improved gaming console for enhancing the video gaming experience of a game player, thereby providing a cockpit-like feel. In one aspect, the present invention provides a seat that can be mounted onto and supported by the game player's existing chair, so that the game player can sit in the seat and be supported at an elevation suitable for home video game playing. Armrests are mounted on the seat, providing a surface upon which the game player can rest his or her arm while playing a home video game. The armrests are equipped with device retainers that can maintain a gaming device in a selectable position. Advantageously, the game player can use the gaming devices without needing to use two hands, because the gaming devices are secured to the device retainer.

Stated more specifically, the gaming console is modular in that additional components can be added without changing the basic structure of the gaming console. A laptop table can be added to the basic gaming console, by sliding a laptop table arm into a groove, running along a medial axis of the seat. The laptop table provides a flat, smooth surface upon which a computer keyboard or an additional gaming device can be secured. A mouse pad can also be added to the gaming console by attaching the mouse pad to mounting brackets on one of the armrests. A storage compartment can also be added to the gaming console by attaching the storage compartment to mounting brackets on one of the armrests. Also, a sound system can be added to the gaming console, by mounting speakers on the underside of the armrests.

The gaming console can be secured to the game player's chair, by a safety strap that can be buckled around the seat of the chair. Each armrest can be tilted toward the game player, thereby creating the effect of the game player being surrounded by a control panel. The armrests can be rotated around a hinge, to place the gaming console in a folded state for transport or for storage.

In another aspect of the invention, a seat is provided upon which the game player can sit. At least one armrest is mounted to the seat, the top of the armrest being tilted toward the game player, thereby creating the effect of the game player being surrounded by a control panel. A device retainer is mounted to each armrest and provides a means for securing a gaming device in a selectable position. A laptop table is also provided for securing a computer keyboard or a gaming device thereto.

The various aspects of the present invention may be more clearly understood and appreciated from a review of the following detailed description of the disclosed embodiments and by reference to the appended drawings.

DETAILED DESCRIPTION

The present invention is directed to enhancing a game player's enjoyment of home video gaming systems. Most home video gaming systems, whether a dedicated system or a personal computer, are equipped to provide a game display on a monitor and accept input signals from an input device or gaming device, such as a joystick or button pad. If the gaming system is a personal computer, then additional input devices may include such devices as a keyboard or a mouse. The present invention provides a gaming console to augment the basic components of such gaming systems by providing a means for placing a variety of input devices within the reach of the game player.

By permitting the game player to surround himself or herself with input devices, the gaming console can provide a cockpit-like effect, wherein the game player has the capability of utilizing any of the input devices within his or her reach at any time. The gaming console also provides a means for securing the input devices, so that the game player may use them without having to use more than one hand. Another benefit is that more than one input device may be used at the same time. For example, by using two joysticks rather than one, the game player may be able to use one as a steering device and the other as a throttle device. If the game player tires of playing video games and wishes to browse the Internet, a laptop table for a computer keyboard can be moved into place for the game player to input keyboard data. Likewise, a mouse pad may be made available, so that a mouse can be used by the game player. In all cases, the gaming console provides a means for surrounding the game player with input devices, such that the devices are within the game player's armspan while the game player is seated in the gaming console.

Figure 1:
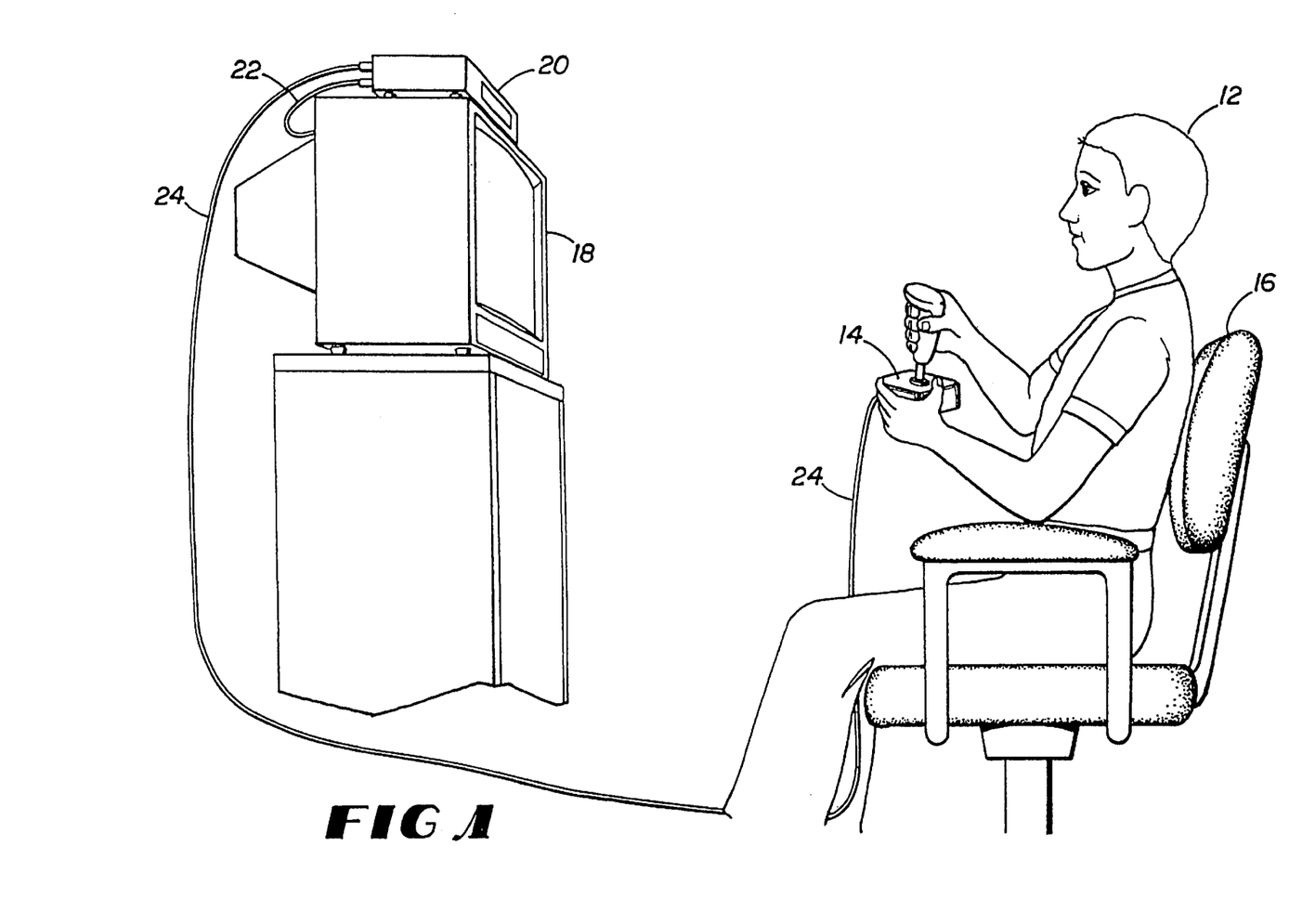
FIG. 1 is a pictorial representation of a home video game player using a video gaming system in an exemplary environment.

Turning now to the drawings in which like numbers reference like parts in the several figures, FIG. 1 depicts a side view of a conventional home video game playing environment. In this environment, a game player 12 uses a gaming device 14 by holding the device and manipulating its control mechanisms. For example, the game player 12 may hold the base of a joystick, while manipulating a control stick of the joystick. The gaming device 14 is typically connected to a game playing system 20 via a single device connection 24. The game playing system 20 is typically connected to a monitor 18 via a single video connection 22. The game playing system 20 produces video images on the monitor 18 pertaining to a video game being played. This environment is typical of that available to home video game players. Typically, a chair 16 is used to locate the game player 12 before the monitor 18. The game playing system 20 may be a dedicated video game playing system or a personal computer with more general capabilities.

Figure 2A:
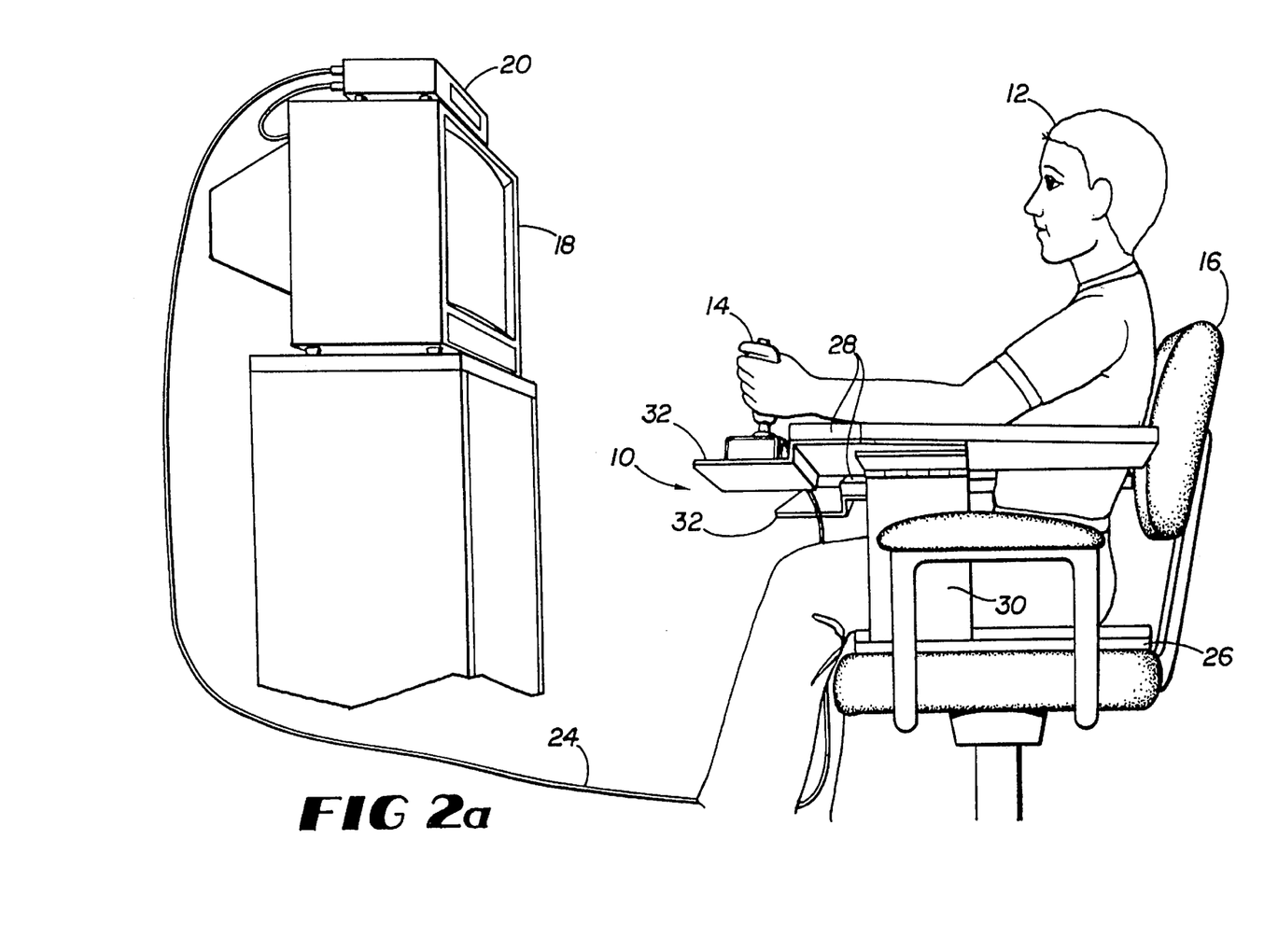
FIG. 2a is a pictorial representation of a home video game player using a video gaming system in conjunction with an embodiment of the present invention.

In FIG. 2a, an exemplary embodiment of the gaming console 10 is depicted in the typical game playing environment, the gaming console having a seat 26, two armrests 28, and two armrest supports 30. A device retainer 32 protrudes from the end of each armrest 28 and provides a smooth flat surface upon which the gaming device 14 may be placed and secured. In this embodiment of the gaming console 10, a game player 12 may use the gaming device 14 to control the game playing system 20. The gaming console 10, therefore, can be placed within the game player's chair 16 and provides a seat 26 upon which the game player may sit, while using the game playing system 20. The armrests 28 provide support for the game player's arm and hold the gaming device 14 in a selectable position, such that the game player need not hold the base of the game playing device with the game player's other hand. The ability of the gaming console 10 to hold the gaming device 14 also permits the game player 12 to relax his/her arm by resting it on the armrest, even while playing the home video game.

Figure 2B:
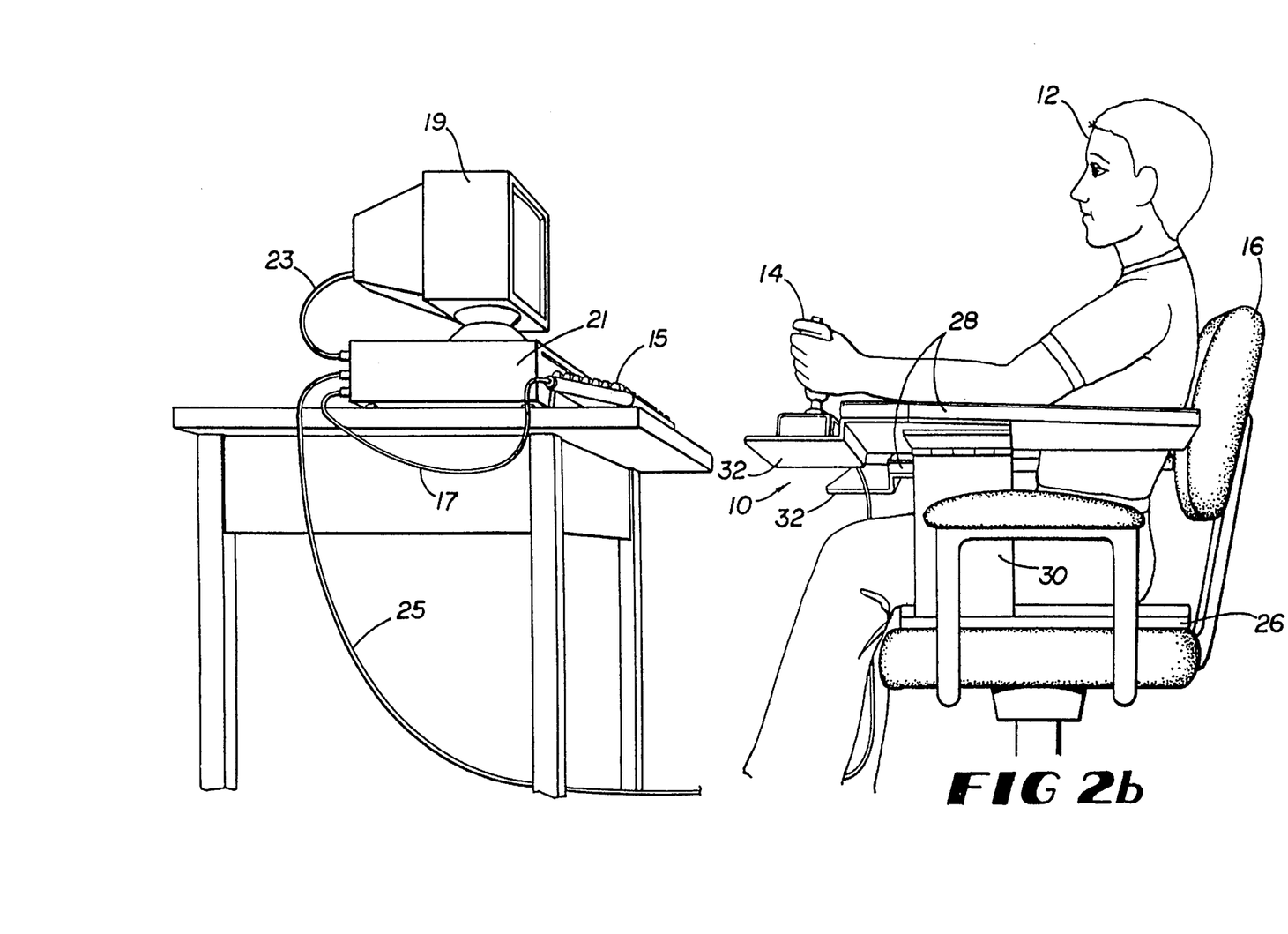
FIG. 2b is a pictorial representation of a home video game player using a personal computer gaming system in conjunction with an embodiment of the present invention.

In FIG. 2b, an exemplary embodiment of the gaming console 10 is depicted in the typical game playing environment, wherein the gaming system is a personal computer gaming system 21, rather than the video game playing system 20 depicted in FIG. 2a. The gaming device 14 is typically connected to a personal computer gaming system 21 via a single device connection 25. The personal computer gaming system 21 is typically connected to a computer monitor 19 via a single video connection 23. The personal computer gaming system 21 produces video images on the monitor 19 pertaining to a video game being played, just as with the dedicated game playing system 20. Usually, the personal computer gaming system 21 will be equipped with a keyboard 15 connected to the personal computer gaming system 21 by a keyboard connection 17. The benefits described above, in connection with the dedicated game playing system 20 of FIG. 2a, translate to the use of the gaming console 10 with a personal computer gaming system 21. As more and more game playing software and hardware are developed for the personal computer, however, the game playing environment of FIG. 2b will become the more typical game playing environment.

Figure 3:
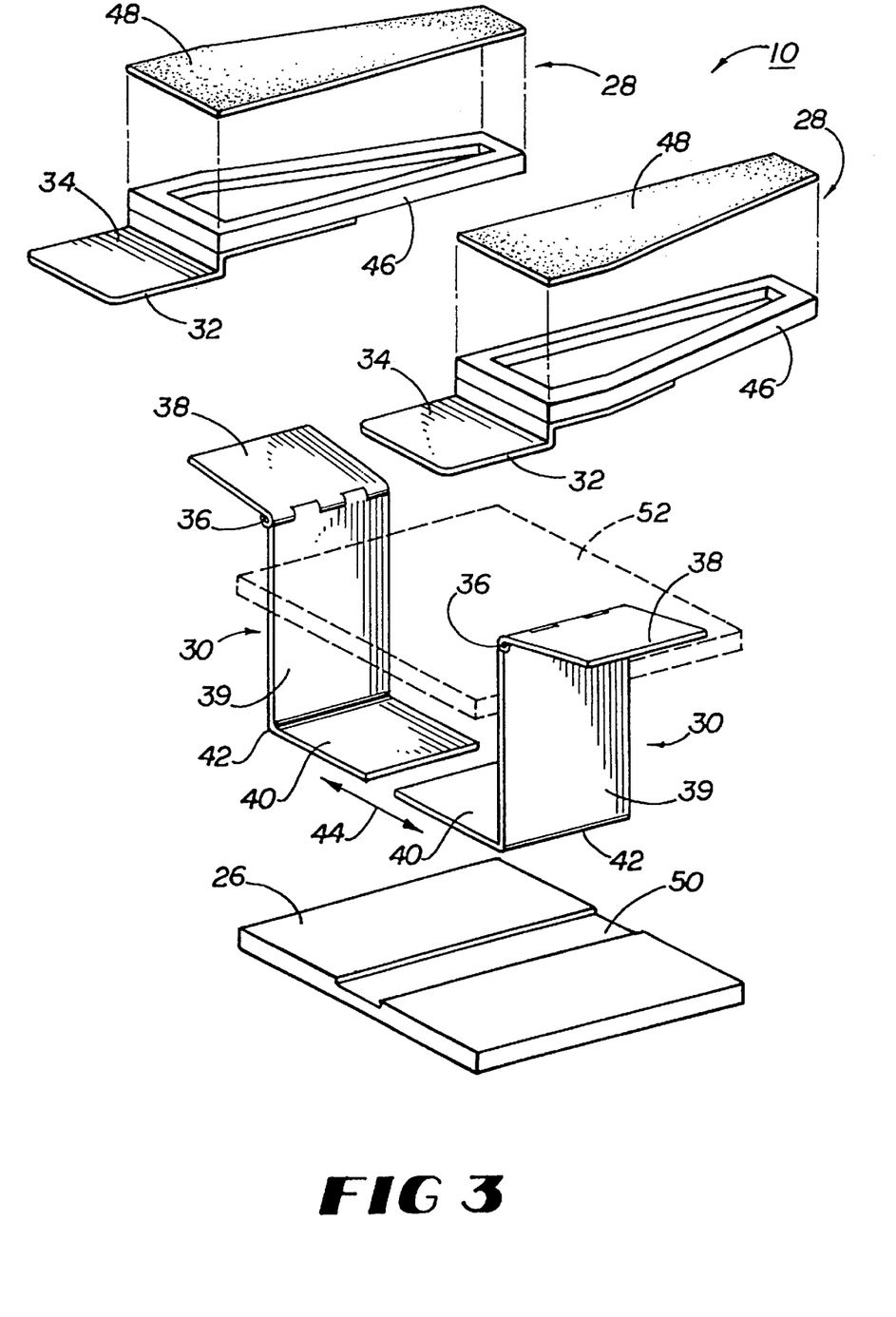
FIG. 3 is an exploded view of the embodiment shown in FIG. 2.

FIG. 3 depicts an exploded view of an exemplary embodiment of the present invention. The embodiment of the gaming console 10 depicted has two armrests 28 that are connected to the seat 26 by armrest supports 30. The armrests 28 have device retainers 32 that protrude from the front-most edges of the armrests. The device retainers 32 are constructed of rigid material such as steel or plastic and provide a generally flat surface 34. The device retainers 32 may be attached to the underside of each armrest 28, so that the device retainers hang from the armrests.

The armrests 28 can be constructed of a material sufficient for supporting the weight of a human arm, such as wood, metal, or plastic. A lightweight embodiment of the armrest 28 is shown in FIG. 3, in which each armrest 28 consists of an armrest frame 46 and an armrest cover 48. The armrest frame 46 provides the structural support required for the armrest 28, while the armrest cover 48 provides a surface comfortable to the arm of the game player. The armrest cover 48 can be made of plastic or wood, molded to fit the contour of a human arm. Alternatively, the armrest cover 48 can be a cushion with a rigid underside, so that it is comfortable to the arm of the game player and provides sufficient support for the weight of the arm.

Each armrest 28 is mounted onto an armrest support 30. The armrest supports 30 are foldable at hinges 36 so that the armrests 28 can be folded toward a medial axis of the gaming console 10. An armrest mounting flange 38 provides a means for mounting the armrest 28 onto the armrest support 30. A seat mounting flange 40 provides a means for mounting the armrest support 30 to the seat 26. Each armrest support 30 also has an upright portion 39 that extends between the seat mounting flange 40 and the armrest mounting flange 38. The upright portion 39 and the seat mounting flange 40 may be constructed as a single part, with a 90 degree bend 42 at the point at which they meet.

The seat mounting flange 40 can be screwed or bolted onto the seat 26. Alternatively, the seat mounting flange 40 can be secured to the seat 26 in such a way as to permit the armrest supports 30 to be moved apart from one another in the direction indicated by the arrow 44 in FIG. 3. Adjusting the armrest supports 30 in this way permits the gaming console 10 to be used by game players of various girths.

The seat 26 is generally rectangular and can be manufactured from a rigid material such as metal, wood or plastic, sufficient to support the weight of the game player, preferably without sagging. The seat 26 has a groove 50 running along a medial axis of the seat. The groove 50 is dimensioned to provide for a laptop table support arm to be inserted into the groove and for the laptop table support arm to be moved along the medial axis of the seat 26. The laptop support arm will be discussed in more detail in connection with FIG. 6. The seat 26 is also equipped with a safety strap 54 (FIGS. 4a–4b) for securing the seat to the game player's chair 16.

The seat 26 is covered with a seat cover 52 (shown in dashed lines in FIG. 3) which is designed to make the seat comfortable to the game player. The seat cover 52 can be made of a rigid plastic or wood, molded to fit the contour of a human's buttocks. Alternatively, the seat cover 52 can be a cushion with a rigid underside, so that it is comfortable to the game player and provides sufficient support for the weight of the human as well as for the laptop support arm, which contacts the underside of the seat cover. Still another alternative is to provide a chair as a substitute for the seat 26 of the gaming console 10.

One advantage of the present invention, is that it secures the gaming device 14 so that the user need not use more than one hand to operate the gaming device. The device retainers 32 provide the means by which the gaming console 10 restrains gaming devices 14. As discussed above, the device retainers 32 provide a flat surface 34 upon which a gaming device 14 can be mounted. However, in order to secure the gaming device 14, a securing mechanism is required. The gaming device 14 can be secured to the device retainer 32 in a number of ways. A first way is to provide retaining straps (not shown) that are attached to the underside of the device retainer 32 and can be strapped over the top of the gaming device 14. Such retaining straps could be constructed from a nylon-like material and could be adjustable by means of a Velcro fastening device. A second way to secure the gaming device 14 to the device retainer 32 is to cover the flat surface 34 of the device retainer and the bottom surface of the gaming device with Velcro material, so that the surfaces can be attached. A final way to secure the gaming device 14 to the device retainer 32 is to utilize suction cups to attach opposing surfaces.

Another advantage of the present invention, is that it provides the game player with a cockpit-like feel. The armrests 28 are angled toward the user, in order to produce the effect of having wrap-around controls. A stop (not shown) is provided to limit the pivotal movement of the armrest mounting flange 38 around the hinge 36. An angle of between 15 and 20 degrees from horizontal can provide the desired wrap-around effect. As an alternative, the stop could be adjustable so that the game player can select an angle that is most suitable to the game player. Because the seat 26 is secured to the game player's chair 16 by the safety strap 54, the game player can lean in any direction without serious risk of separating the gaming console 10 from the chair 16. This freedom of game player movement is another aspect of the invention lending to the cockpit-like effect.

As discussed above, the device retainers 32 hang from the front-most ends of the armrests 28. Because the flat surface 34 of each device retainer 32 is lower than the surface of the armrest cover 48, the bottom surface of the gaming device 14 is retained at a level lower than that at which the game player's arm usually rests (i.e., on the armrest cover). The game player may relax his or her arm on the armrest 28, while using the gaming device 14, because the game player need not lift his or her arm in order to grasp the gaming device.

Figure 4A:
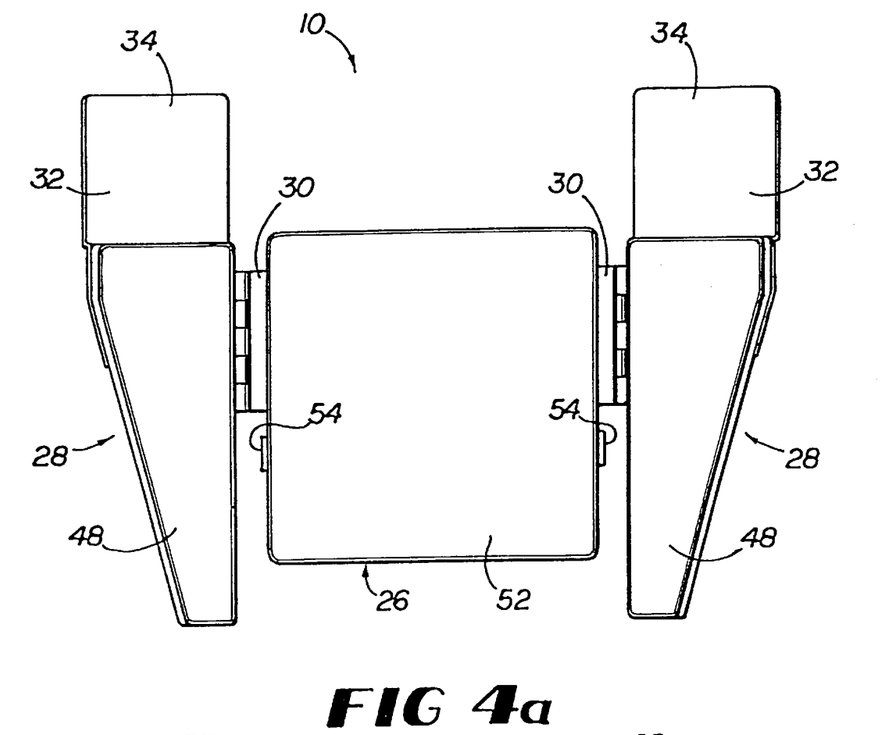
FIG. 4a is a top view of the embodiment shown in FIG. 2.

Referring now to FIG. 4a, a top view is shown of an embodiment of the assembled gaming console 10. In this embodiment, the seat cover 52 and the armrest covers 48 comprise cushions mounted on a rigid underside. The device retainers 32 protrude from the front edge of the armrests 28 to provide flat surfaces 34 upon which gaming devices 14 can be mounted. Armrest supports 30 extend substantially vertically from the sides of the seat 26 to the inside edges of the armrests 28. The seat 26 is securable to the game player's chair by means of the safety strap 54.

Figure 4B:
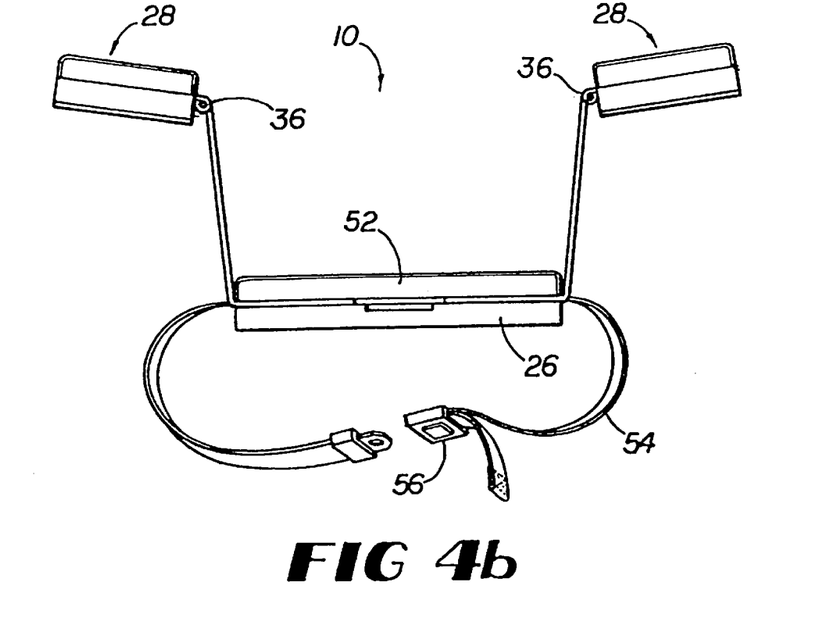
FIG. 4b is a front view of the embodiment shown in FIG. 2.

Referring now to FIG. 4b, a front view of an embodiment of the gaming console 10 is shown. In this view, the safety strap 54 is shown, having a buckle 56. Virtually any means of securing the ends of the safety strap together (e.g., Velcro material) is sufficient for the purposes of securing the gaming console 10 to the game player's chair 16. Preferably, the length of the safety strap 54 is adjustable to accommodate chairs of varying sizes. Because the safety strap is sandwiched between the seat 26 and the seat cover 52, the safety strap is securely fastened to the gaming console 10.

The armrests 28 are rotatable around the hinges 36 of the armrest supports 30 in the directions of the arrows 58. The armrests 28 are shown in FIG. 4b in their operable positions, roughly 15 to 20 degrees from horizontal. When the armrests 28 have been rotated toward the medial axis of the seat, the gaming console 10 can be folded for transport and/or storage.

Figure 5A:
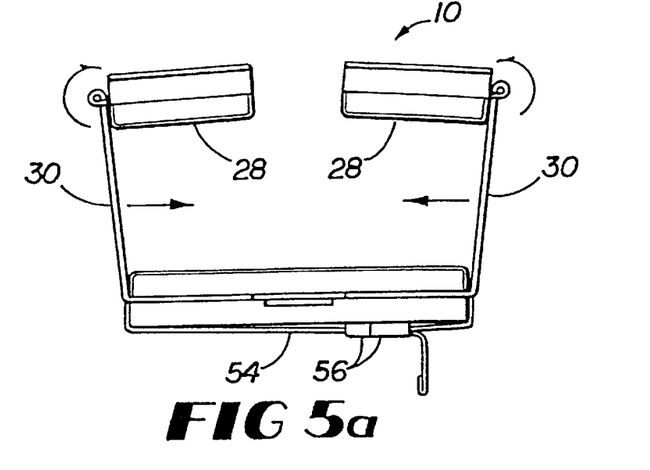
FIG. 5a is a front view of the embodiment of FIG. 2 in a storage position.

FIG. 5a depicts the game console 10 where the armrests 28 have been folded toward the medial axis of the gaming console. The armrests 28 are shown in their storage position. Once the armrests have been placed in the storage position, the armrest supports 30 can be adjusted to a position in which the armrest supports are closest to one another, as described in connection with FIG. 3. This arrangement of the armrests 28 and armrest supports 30 reduces the gaming console 10 to its smallest outside dimensions. Thus, it becomes easier to handle and requires less volume for storage. The safety strap 54 can be connected on the underside of the gaming console 10 by the buckles 56 in order to restrain the safety strap for transport and/or storage.

Figure 5B:
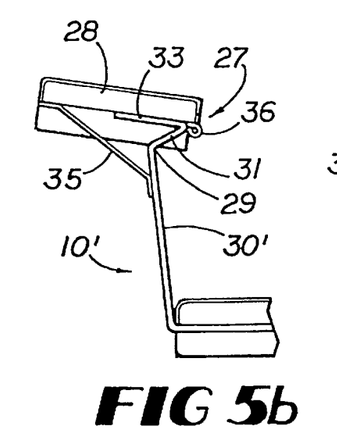
FIG. 5b is a rear view of an alternative embodiment of the present invention in an operating position.
Figures 5C, 5D:
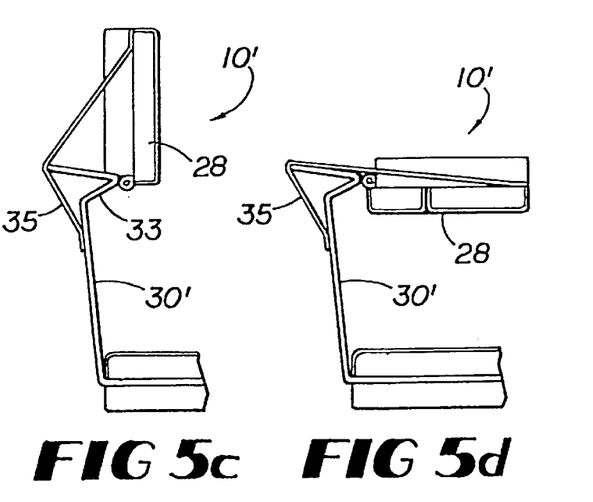
FIG. 5c is a rear view of an alternative embodiment of the present invention in a folded position.
FIG. 5d is a rear view of an alternative embodiment of the present invention in a storage position.

FIGS. 5b–5d depict a rear view of the armrest 28 in an alternative embodiment of the gaming console 10'. In FIG. 5b, the upright support 30' has a stop 27 that restricts the movement of the armrest 28. Specifically, the armrest can move about the hinge 36 until the underside of the armrest 28 rests on the stop 27. The stop 27 can be built as an integral part of the upright support 30' by putting two bends in the material of which the support is constructed. A first bend 29 can be made, at about a 45 degree angle with respect to the plane of the upright portion of the upright support 30'. A second bend 31 can be made, at about a 20 degree angle with respect to a horizontal plane. The portion of the upright support above the second bend forms a resting portion 33 upon which the armrest 28 is supported in a operating position.

FIG. 5c depicts a rear view of the armrest 28 being moved about the hinge 36 away from its operating position (i.e., supported by stop 27). An elastic band 35 constrains the movement of the armrest 28 about the hinge 36. As the armrest is moved toward a storage position, the elastic band 35 becomes strained by the resting portion 33. This restraint prevents the armrest from flopping as the game player moves it from the operating position to the storage position.

FIG. 5d depicts the a rear view of the armrest 28 in a storage position. The elastic band 35 is stretched to its maximum length in this storage position. As an alternate means of securing the armrest 28 in this position, the game player may connect the ends of the safety strap 54 (shown in FIG. 5a) over the top of the gaming console 10' to maintain the armrests 28 in their storage position.

Figure 6:
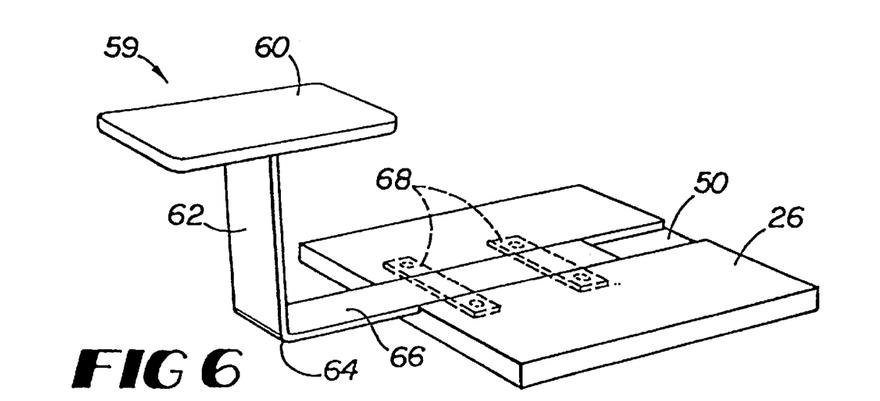
FIG. 6 is a perspective view of an alternative embodiment of the present invention equipped with a laptop table.

FIG. 6 depicts a laptop table 59 that can be added as a modular component of the gaming console 10. The laptop table has a flat table top surface 60 that is mounted on a table support arm 62. The table support arm 62 is bent to form a 90 degree elbow 64. An elongate horizontal portion 66 slides into the groove 50 in the seat 26. The table support arm 62 can be retained in the groove 50 by retaining bars 68 (shown in dashed lines) or by the seat cover 52 (FIG. 3).

Because the elongate horizontal portion 66 of the table support arm 62 slides freely in the groove 50 of the seat 26, the table top surface is adjustable in that it may be selectably positioned closer or further away from the game player, while the gaming console 10 is in use. The table top surface 60 is smooth, thereby providing a suitable surface for mounting a computer keyboard and/or gaming devices 14. As with the device retainers 32, the keyboard/gaming device 14 can be secured to the table top surface 60 in a number of ways. A first way is to provide retaining straps (not shown) that are attached to the underside of the table top surface 6 0 and can be strapped over the top of the keyboard/gaming device 14. Such retaining straps could be constructed from a nylon-like material and could be adjustable by means of a Velcro fastening device. A second way to secure the keyboard/gaming device 14 to the table top surface 60 is to cover the flat surface of the table top surface and the bottom surface of the gaming device with Velcro material, so that the surfaces can be attached, thereby securing the gaming device to the table top surface. A final way to secure the keyboard/gaming device 14 to the table top surface 60 is to utilize suction cups.

Figures 7A, 7B, 8A, 8B:
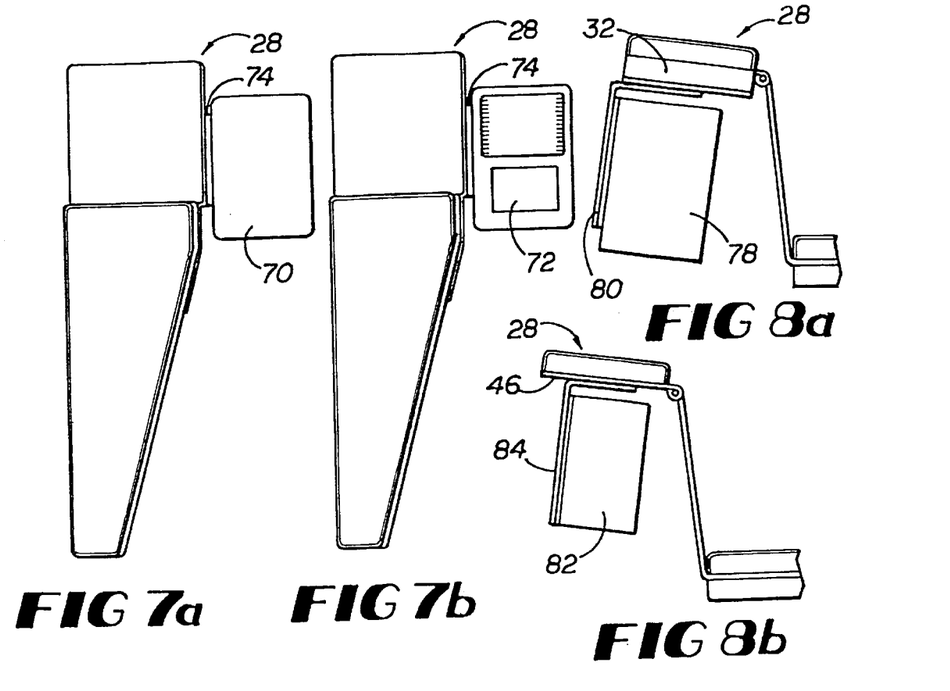
FIG. 7a is a top view of an alternative embodiment of the present invention, equipped with a mouse pad.
FIG. 7b is a top view of an alternative embodiment of the present invention, equipped with a storage compartment.
FIG. 8a is a front view of an alternative embodiment of the present invention, equipped with a front speaker.
FIG. 8b is a front view of an alternative embodiment of the present invention, equipped with a rear speaker.

Referring now to FIG. 7a, an armrest 28 of the gaming console 10 is shown with a mouse pad 70. The mouse pad 70 has a generally flat surface and can be used to operate a mouse thereon. FIG. 7b depicts an armrest 28 of the gaming console 10 is shown with a storage compartment 72. In one embodiment of the present invention the storage compartment 72 is sized to accommodate the storage of video game cartridges, compact disks, and other computer and video game related items. In an exemplary embodiment of the present invention, the component brackets 74 are affixed to the outside edge of each armrest 28 and provide a means for securing the mouse pad 70 and the storage compartment 72.

Referring now to FIG. 8, an embodiment of the present invention is shown with a speaker system. In an exemplary embodiment, four speakers can be mounted on the gaming console 10 to provide amplification of the sound output of the video gaming system 20. FIG. 8a depicts a front view of an armrest 28 having a device retainer 32. A front speaker 78 is mounted onto a front speaker bracket 80. The front speaker bracket 80 is mounted onto the underside of the device retainer 32. Thus, the front speaker 78 hangs from the underside of the device retainer 32 and can face the rear of the gaming console 10.

FIG. 8b depicts a rear view of an armrest 28 having a armrest frame 46. A rear speaker 82 is mounted onto a rear speaker bracket 84. The rear speaker bracket 84 is mounted onto the underside of the armrest frame 46. Thus, the rear speaker 82 hangs from the underside of the armrest frame 46 and can face the front of the gaming console 10.

Figure 8C:
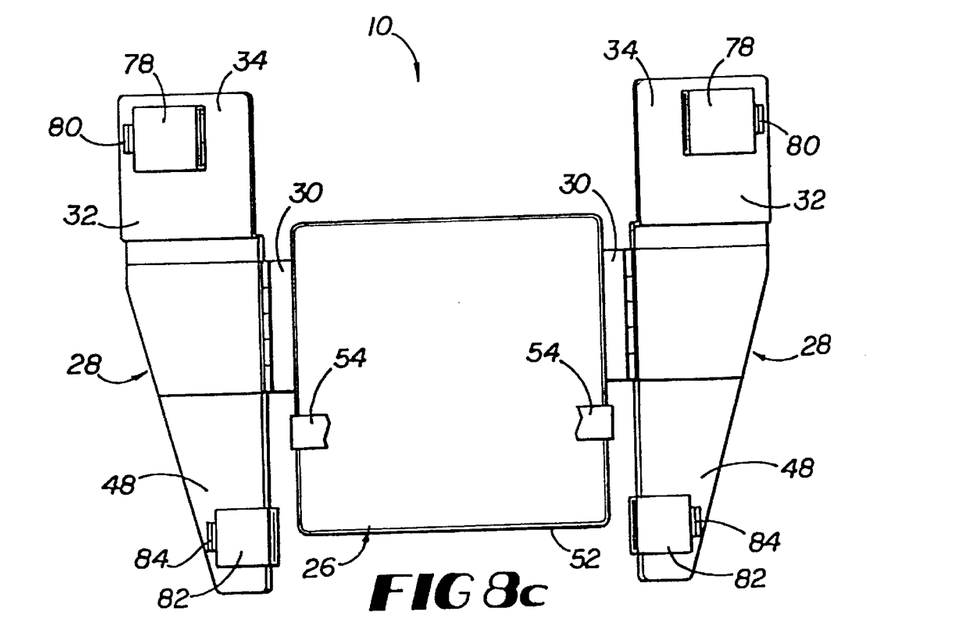
FIG. 8c is a bottom view of an alternative embodiment of the present invention, equipped with four speakers.

FIG. 8c depicts a bottom view of the gaming console 10, having a four speaker sound system. Rear speakers 82 are mounted to the rear-most portions of the armrests 28 by rear speaker brackets 84. Front speakers 78 are mounted onto the underside of the device retainers 32 with front speaker brackets 80. Because the speakers are mounted on all sides of the game player and can be selectably positioned with respect to the game player, a surround-sound effect can be produced.

In an exemplary embodiment, two armrests can be provided with a front speaker 78 and a rear speaker 82, thereby providing a four speaker sound system. As an alternative, both the front speaker bracket 80 and the rear speaker bracket 84 may be adjustable so that the front speaker 78 and the rear speaker 82 may be selectably positioned to optimize the sound system. As is well known to those skilled in the art, speakers for computers and video gaming systems are readily available. Many such speakers are equipped with built in amplifiers and volume controls, suitable for receiving an output signal from the gaming system 20 and playing the sound output at an amplified level.

In sum, the present invention provides a gaming console for enhancing a game player's enjoyment of home video gaming systems. A game player may mount input devices (e.g., gaming devices) on the gaming console's device retainers. By permitting the game player to surround himself or herself with input devices, the gaming console can provide a cockpit-like effect, wherein the game player has the capability of utilizing any of the input devices mounted on the console at any time. The gaming console also provides a means for securing the input devices, so that the game player may use them without having to use both hands. Another benefit is that more than one input device may be used at the same time. If the game player tires of playing video games and wishes to browse the Internet, a laptop table for supporting a keyboard can be swung into place for the game player to input keyboard data. Likewise, a mouse pad may be made available, so that a mouse can be used by the game player. In all cases, the gaming console provides a means for surrounding the game player with input devices, such that the devices are within the game player's armspan while the game player is seated in the gaming console.

It should be understood that the foregoing relates only to a preferred embodiment of the present invention, and that numerous modifications and changes therein may be made without departure from the spirit and scope of the invention as defined in the following claims.

I claim:

1. A gaming console for mounting on a chair and for supporting a game player comprising:
   a seat upon which the game player can sit that is which include means for removeably mounting to a chair seat;
   at least one armrest functionally connected to the seat by an armrest support, wherein the armrest support is laterally adjustable with respect to the seat such that the seat can be mounted between the armrests of chairs of various sizes; and
   wherein the at least one armrest comprises a device retainer for maintaining at least one gaming device in a selectable position with respect to the game player.

2. The gaming console of claim 1, wherein the seat is so dimensioned as to be insertable between armrests of the chair.

3. The gaming console of claim 1, further comprising a chair onto which a bottom surface of the seat is mounted.

4. The gaming console of claim 1, further comprising a mouse pad associated with the at least one armrest and having a surface suitable for operating a mouse thereon.

5. The gaming console of claim 4, wherein the mouse pad is connected to a mounting bracket on the at least one armrest.

6. The gaming console of claim 1, further comprising a laptop table associated with the at least one armrest and for maintaining a computer keyboard or the at least one gaming device in a selectable position.

7. The gaming console of claim 6, wherein the laptop table is connected to the seat by a laptop table arm, the laptop table arm being operative to selectably position the at least one gaming device or the computer keyboard.

8. The gaming console of claim 7, wherein the laptop table arm is insertable into a groove in the seat, thereby permitting the laptop table to be selectably positioned along a longitudinal axis of the groove.

9. The gaming console of claim 1, further comprising a sound system comprising at least one speaker associated with the at least one armrest.

10. The gaming console of claim 9, wherein the at least one speaker is removeably mounted on the device retainer.

11. The gaming console of claim 1, wherein the at least one armrest is tilted along a longitudinal axis of at least one armrest toward a medial axis of the seat.

12. The gaming console of claim 11, wherein the at least one armrest is adjustable so that the at least one armrest can be selectably positioned at various angles.

13. The gaming console of claim 1, wherein the at least one armrest is operative to be moved inwardly toward the medial axis of the seat into a storage position, thereby reducing the overall width of the gaming console.

14. The gaming console of claim 13, wherein the at least one armrest can be locked into the storage position so that the gaming console can be transported in the collapsed position.

15. The gaming console of claim 1, further comprising a strap associated with the seat and operative to secure the seat to the chair.

16. The gaming console of claim 15,
    wherein the strap is secured to the seat and has two free ends; and
    wherein the ends can be fastened to one another.

17. The gaming console of claim 1, further comprising a storage compartment associated with the at least one armrest.

18. The gaming console of claim 17, wherein the storage compartment is connected to a mounting bracket on the at least one armrest.

19. The gaming console of claim 1, wherein the at least one armrest further comprises an armrest cover.

20. The gaming console of claim 19, wherein the armrest cover comprises a cushion.

21. The gaming console of claim 19,
    wherein the armrest cover comprises a molded portion; and
    wherein the molded portion is molded to conform to the shape of a human arm, so that the armrest cover is comfortable for the game player's arm.

22. The gaming console of claim 1, further comprising a seat cover mounted on a top surface of the seat.

23. The gaming console of claim 22, wherein the seat cover comprises a cushion.

24. A gaming console comprising:
    a seat upon which a game player can sit, the seat having a left side, a right side, and a medial axis between the left side and the right side, wherein the seat is includes means for removeably mounting to a chair seat;
    at least one armrest mounted to the seat by an armrest support, each armrest having a longitudinal axis which is substantially parallel to the medial axis of the seat and being tilted, along the longitudinal axis of each armrest, toward the medial axis of the seat;
    a device retainer mounted on each armrest for maintaining at least one first gaming device in a first selectable position;
    a laptop table connected to the seat, for maintaining at least one second gaming device in a second selectable position; and
    wherein the armrest support is laterally adjustable with respect to the seat, such that the seat can be placed upon chairs of various sizes.

25. The gaming console of claim 24, wherein the laptop table is connected to the seat by a laptop table arm, operative to selectably position the laptop table.

26. The gaming console of claim 24, wherein the seat is so dimensioned as to be insertable between armrests of a chair.

27. A gaming console for mounting on a chair and for supporting a game player comprising:
    a seat upon which the game player can sit;
    at least one armrest functionally connected to the seat, the at least one armrest comprising a device retainer for maintaining at least one gaming device in a selectable position with respect to the game player; and
    a laptop table associated with the at least one armrest and for maintaining a computer keyboard or the at least one gaming device in a selectable position,
    wherein the laptop table is connected to the seat by a laptop table arm, the laptop table arm being operative to selectably position the at least one gaming device or the computer keyboard, and
    wherein the laptop table arm is insertable into a groove in the seat, thereby permitting the laptop table to be selectably positioned along a longitudinal axis of the groove.

28. A gaming console for mounting on a chair and for supporting a game player comprising:
    a seat upon which the game player can sit;
    at least one armrest functionally connected to the seat;
    the at least one armrest comprising a device retainer for maintaining at least one gaming device in a selectable position with respect to the game player; and
    a sound system comprising at least one speaker associated with the armrest and responsive to an output signal of a gaming system, wherein the at least one speaker is mounted on the device retainer.

* * * * *